March 10, 1970     I. T. HO     3,500,184
TRANSMISSION LINE SIMULATION Filed Oct. 31, 1966     6 Sheets-Sheet 1

INVENTOR
IRVING T. HO
BY Martin G. Reiffin
ATTORNEY

"D" CHANGED TO 6.5"

March 10, 1970     I. T. HO     3,500,184

TRANSMISSION LINE SIMULATION

Filed Oct. 31, 1966     6 Sheets-Sheet 5

United States Patent Office 3,500,184
Patented Mar. 10, 1970

3,500,184
TRANSMISSION LINE SIMULATION
Irving T. Ho, Poughkeepsie, N.Y., assignor to International Business Machines Corporation, Armonk, N.Y., a corporation of New York
Filed Oct. 31, 1966, Ser. No. 590,589
Int. Cl. G01r *31/11, 27/04;* G06g *7/26*
U.S. Cl. 324—57                                    13 Claims

ABSTRACT OF THE DISCLOSURE

A test system physical model constituting a delay line and an RC network for representing a current switch emitter-follower in a transmission line interconnection network.

---

This invention relates to transmission line simulation, and more particularly to a simulator apparatus and method for determining the transient response of a transmission line loaded by a plurality of active circuits such as nonlinear current switches or other digital circuits.

In the present state of the art of high performance computers, transmission lines are employed to interconnect current switches or other digital circuits into logic nets. Each current switch circuit comprises several active transistors as well as passive network components and is nonlinear. The spatial arrangement of these circuits in a logic net along the length of a transmission line is generally random. When a ramp function input signal propagates along the transmission line, successive reflections are created at those mismatched nodes where switching circuits are connected to the line. The accumulation of reflections when these switching circuits are not arranged and spaced properly along the line may result in excessive delay or improper switching response in some or all of these circuits, so that proper logic performance cannot be obtained. It is therefore necessary to resort to interconnection analysis in the design of the computer so that improper arrangements of the switching circuits are obviated.

This transmission line interconnection analysis problem is both nonlinear and non-periodic and has not heretofore been solved in a satisfactory manner. One prior art method has been to devise equivalent circuit models for the transistors and to perform a numerical analysis of the resulting network on a general purpose computer. However, the analysis of each net involves so much computer time, and there are so many logic nets in a computer, that this method is not economically feasible.

Another prior art method has been to construct physically a large number of prospective logic nets with actual transmission lines and circuit devices and then measure the transient response thereof so as to formulate a set of wiring rules for the interconnection layout to be employed in the computer. This results in an excessively complicated set of wiring rules which have only a limited application for particular devices and for particular circuit configurations. Furthermore, this method involves the use of mathematical induction to devise the wiring rules, and because of the nonlinear non-periodic nature of the system it is necessary to provide a large safety margin in the formulation of the rules. As a result the latter become unduly restrictive with resulting limitations on the interconnection wireability.

It is therefore a primary object of the present invention to provide an improved method and apparatus for solving this interconnection analysis problem by testing a simulated model of the transmission line with the switching circuit models connected thereto.

For each switching circuit there is constructed a linear model which may be attached to the simulated transmission line model anywhere along its length. A ramp function input signal is then applied to the transmission line model and the transient response at the connection nodes of each circuit model may be observed on an oscilloscope. The effects of changing the spacing of the circuits along the line, or increasing or decreasing the number of circuits connected thereto, may then be readily observed and a suitable set of wiring rules may be formulated from these observations.

The circuit model employed to simulate the loading effect of the actual switching circuit on the transmission line is particularly advantageous in several respects. Because it is composed solely of linear components, the dimensions of the simulated line model and circuit models may be readily scaled upwardly to a practical size from the original inconveniently minute dimensions of the actual circuitry. Although from the transfer function standpoint the equivalent circuit of the actual current switch circuit is relatively complex, it has been discovered that from the standpoint of a sufficiently accurate simulated model for presenting an equivalent load on the transmission line the model may be devised with merely two resistors, a capacitor, and a predetermined length of conventional delay line.

Still another advantage of the novel technique of the present invention resides in the ease and simplicity with which the parameters of the simulated circuit model may be varied so as to precisely simulate the loading effect of new and different switching circuits as they are developed. By comparing with a dual beam oscilloscope the response at the input terminals of the circuit model with that of the actual circuit it may be readily determined as to which parameters of the model require adjustment for precise simulation, and there may also be determined an approximate indication of the magnitude of the required change.

Other objects and advantages of the present invention are either inherent in the structure disclosed herein or will become apparent to those skilled in the art as the detailed description proceeds in connection with the accompanying drawings, wherein:

Figure 2:
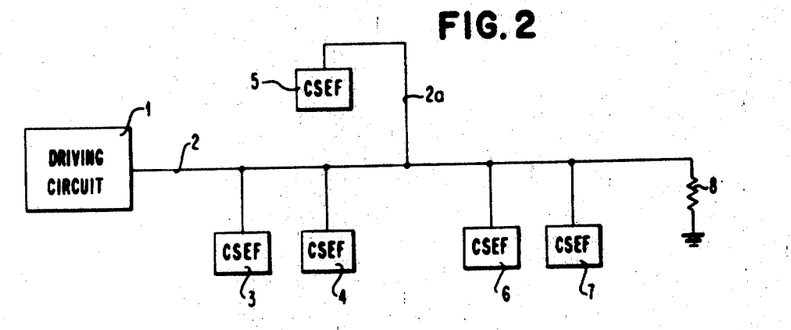
FIG. 2 is a schematic representation of an actual logic net corresponding to the simulator apparatus of FIG. 1 and showing a plurality of switching circuits connected to a transmission line.

Referring now in particular to FIG. 2, there is disclosed a schematic diagram of a typical actual logic net comprising a driving circuit 1 for driving one end of a transmission line 2 having a number of current-switch emitter-follower logic circuits 3, 4, 5, 6, 7 connected to the line 2 at spaced points therealong. The end of the transmission line 2 is loaded as indicated by the resistor symbol 8. The circuit 5 is shown connected to transmission line 2 through a branch line 2a.

Figure 1:
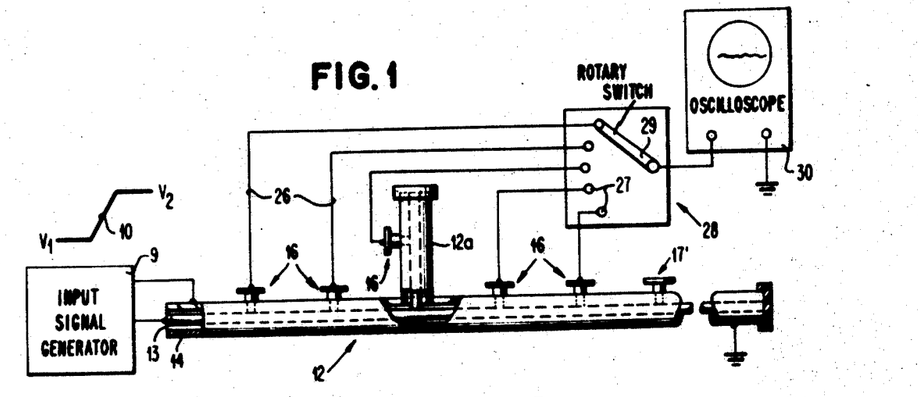
FIG. 1 is a schematic representation of a preferred simulator apparatus in accordance with the present invention.

In FIG. 1 there is shown a preferred embodiment of the apparatus for simulating the response of the actual logic net shown in FIG. 2, and comprising an input signal generator 9 for generating a stepped ramp function signal shown at 10 and applying the signal to one end of a simulated transmission line model indicated generally by the reference numeral 12. The construction of the latter is best seen in FIG. 3 and comprises a coaxial line having an inner conductive core 13 spaced from and surrounded by an outer conductive shield 14 having formed along its upper portion an elongated slot 15 extending therethrough.

Figure 3:
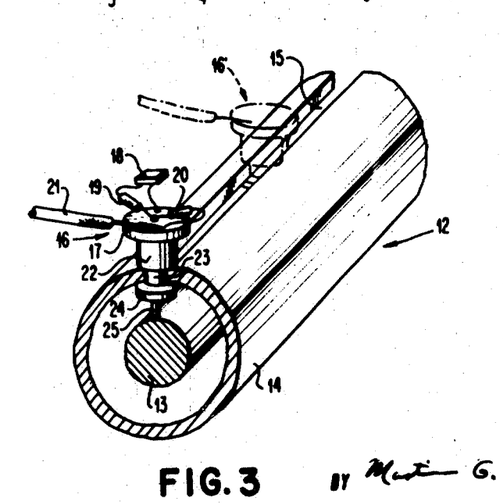
FIG. 3 is a perspective view of a portion of the simulated transmission line model with a single circuit model attached thereto.

Each of the actual current switch emitter-follower logic circuits 3 to 7 inclusive of FIG. 2 is simulated by a circuit model as shown in FIG. 3 and indicated generally by the reference numeral 16. Each circuit model 16 comprises a substrate 17 upon which is mounted a capacitor 18, a pair of resistors 19, 20 and a predetermined length of delay line 21, all interconnected in a manner to be described below.

Extending downwardly from substrate 17 is a shoulder 22 having a lower planar surface engaging the outer surface of shield 14, a reduced cylindrical element 23 extending through the slot 15, a lower shoulder portion 24 engaging the inner surface of shield 12, and a contact pin 25 engaging inner conductive core 13. Cylindrical element 23 is slidable within slot 15 whereby circuit model 16 may be moved to any selected position along the length of transmission line model 12, as indicated by the dashed line at 16'. A line terminating resistor $R_t$ is similarly mounted upon a substrate 17' for positioning at any selected location along line model 12.

Referring again to FIG. 1, the branch portion 2a of transmission line 2 is simulated by a corresponding branch model 12a having a slotted construction similar to that of the transmission line model 12 as shown in FIG. 3. Branch model 12a is slidably movable to any selected position along line model 12. The length of transmission line model 12 may be the same as that of the actual transmission line 2 if desired, but in view of the minute size of the latter it is preferable to scale the dimensions of model 12 upwardly for convenience in physical manipulation as explained in more detail below. The relative spacing of the several circuit models 16 along transmission line model 12 is scaled in a corresponding manner.

Each circuit model is a two-terminal network with a hot input terminal connected through contact pin 25 to the inner conductive core 13 of transmission line model 12 and the other ground terminal connected to conductive shell 14 which is grounded as shown in FIG. 1. The several hot input terminals are connected through respective leads 26 to the contacts 27 of a rotary switch 28 having a switch arm 29 adapted to connect a respective one of said contacts 27 to the hot input terminal of an oscilloscope 30 which displays the signal response at that circuit model input corresponding to the contact 27 selected by switch arm 29.

Figures 4, 5, 6, 7:
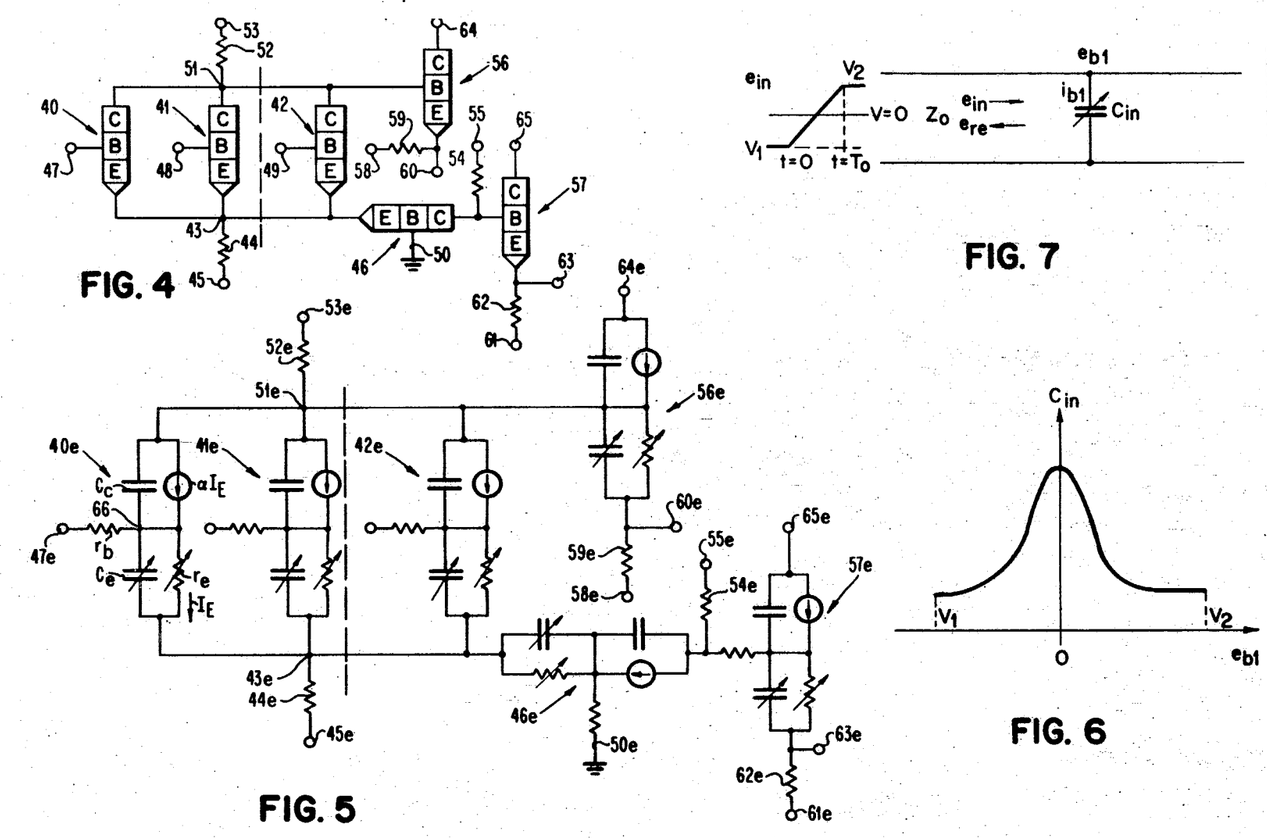
FIG. 4 is a circuit diagram showing a typical current-switch emitter-follower logic gate to be simulated by the circuit model.
FIG. 5 shows an equivalent circuit model of said current-switch emitter-follower of FIG. 4.
FIG. 6 shows a plot of the input capacitance $C_{in}$ vs. the input signal voltage $e_{b1}$ obtained from a low-frequency approximation of the current-switch emitter-follower.
FIG. 7 is a schematic representation of a transmission line loaded by said input capacitance.

In FIG. 4 is shown a circuit diagram of the logic circuit shown as labelled boxes 3 to 7 inclusive in FIG. 2. Each of these logic circuits is disclosed for purposes of illustration as a current-switch emitter-follower, since the invention is particularly adapted to the analysis of a logic net utilizing this type of circuit; however, it will be understood that the invention may also be utilized for the analysis of transmission lines loaded by other types of circuits, including analog as well as digital types and non-linear as well as substantially linear circuits.

The current-switch emitter-follower logic circuit comprises a first stage including transistors 40, 41, 42 having their emitters connected to a common node 43 connected by an emitter resistor 44 to a power supply terminal 45. A second stage comprising a transistor 46 operating in the grounded-base mode also has its emitter connected to node 43. Each base of transistors 40, 41, 42 is provided with a respective input 47, 48, 49 whereas the base of transistor 46 is grounded as at 50. A constant current supplied from terminal 45 through emitter resistor 44 is switched alternately to one or more of the first stage transistors 40, 41, 42 if one or more of the inputs 47, 48, 49 is at its upper logic level by a signal applied thereto, or the constant current is switched to transistor 46 in the event that all of the inputs 47, 48, 49 are at their lower level.

The collectors of transistors 40, 41, 42 are connected at a common node 51 from which extends a load resistor 52 to a power supply terminal 53. The collector of transistor 50 is similarly connected through a load resistor 54 to a supply terminal 55 which may be at the same potential as the supply terminal 53.

The output at the collector node 51 of transistors 40, 41, 42 is direct-coupled to the base of an emitter-follower transistor 56 and the output at the collector of transistor 46 is similarly direct-coupled to the base of a second emitter-follower transistor 57. The emitter-follower transistors 56, 57 provide voltage translation so that successive logic circuits may be cascaded with direct coupling. They further provide a low impedance for both the in-phase and out-of-phase outputs of the logic circuit, and provide a relatively high impedance load on the collectors of transistors 40, 41, 42 and 46 to prevent the latter from being unduly loaded by the following cascaded networks.

The out-of-phase output at terminal 60 is taken at the emitter of transistor 56, connected through load resistor 59 to a power supply terminal 58. The in-phase output at terminal 63 is taken at the emitter of transistor 57. An emitter load resistor 62 extends from a supply terminal 61 to the emitter of transistor 57. The respective collectors of emitter-follower transistors 56 and 57 are connected to supply terminals 64, 65 which may be at the same potential.

The derivation of the linear model to simulate the load impedance presented to the transmission line by each current-switch emitter-follower circuit, and its correspondence to the actual circuit, will now be described utilizing the following symbols:

$C_{in}$—the input impedance of a current-switch emitter-follower
$C_e$—base emitter junction capacitance
$C_c$—base collector junction capacitance
$C$—a capacitance used in the dummy load
$C_1, C_2, C_3$—special values of $C_{in}$
$e_1$—the amplitude of the input signal swing
$e_{b1}$—the voltage at the base of the first transistor in the current-switch emitter-follower
$e_{in}$—input ramp signal voltage
$e_{re}$—reflected voltage from a current-switch emitter-follower when $e_{in}$ is applied
$e_{re1}$—the first reflection voltage when $e_{in}$ is applied to a dummy load
$e_{re2}$—the second reflection voltage when $e_{in}$ is applied to a dummy load
$e_c$—collector voltage of the first stage transistors
$e_e$—emitter voltage at the common emitter of a current-switch emitter-follower
$e_x, e_y, e_z$—special values of $e_{b1}$
$\epsilon_s$—dielectric constant in the simulated line
$\epsilon_o$—dielectric constant in the real transmission line
$i_{b1}$—the transient base current flowing into $C_{in}$ or the input base of a current-switch emitter-follower
$I_{E1}$—emitter current
$k$—Boltzmann constant
$K_r$—scale factor of resistor ($K_r K_c = K_t$)
$K_t$—scale factor of time $$\left(K_t = K_d \sqrt{\frac{\epsilon_s}{\epsilon_o}}\right)$$

$K_c$—scale factor of capacitance
$K_d$—scale factor of distance
$q$—electronic charge
$r$—the number of $m$ transistors which are being turned on
$r_b$—base resistance
$r_e$—emitter resistance
$R_h$—a high resistance at the end of the delay line of the dummy load
$R_L$—terminating resistor of a logic net
$R_s$—a resistance in series with the delay line
$R_t$—a line terminating resistor
$T$—absolute temperature
$T_o$—the time when $e_{in}$ levels off
$t_x, t_y, t_z$—special values of time
$V_1$—low level voltage of $e_{in}$ or $e_{b1}$
$V_2$—high level voltage of $e_{in}$ or $e_{b1}$
$X$—special distance along a logic net
$Z_1$—characteristic impedance of the delay line of the dummy load
$Z_o$—characteristic impedance of the transmission line to which all current-switch emitter-followers are connected
$Z_{os}$—characteristic impedance of the slotted coaxial line in the simulator
$\alpha$—common-base current gain In FIG. 5 there is shown an equivalent circuit representation of the current-switch emitter-follower of FIG. 4. Each of the transistors 40, 41, 42, 46, 56, 57 is replaced by an equivalent circuit designated by the corresponding reference numeral with the suffix "e." Each equivalent circuit comprises an input base resistance $r_b$ connected at a node 66 to the parallel combination of a base-collector junction capacitance $C_c$ and a current-dependent-current generator $\alpha I_E$. Also connected to node 66 is the parallel combination of a base-emitter capacitance $C_e$ and an emitter resistance $r_e$. The terminals, nodes and passive components of the equivalent circuit representation of FIG. 5 have applied thereto the same reference numerals, with the addition of the suffix "e," as the corresponding elements in the circuit of FIG. 4.

Narud, et al. (1963 IEEE International Convention Record, part 2, pp. 178–192) have shown that the input impedance of a current-switch emitter follower is mainly capacitive with the input capacitance $C_{in}$ represented by the following low-frequency approximation:

$$C_{in} \simeq \frac{C_e}{1 + re^{qe_{b1}/kT}} + C_c \left[1 + \frac{\frac{1}{r}\frac{qe_1}{kT}e^{-qe_{b1}/kT}}{\left(1 + \frac{1}{r}e^{-qe_{b1}/kT}\right)^2}\right] \quad (1)$$

where $C_e$, $C_c$ are, respectively, the base-emitter and base-collector junction capacitances, $r$ represents the number of $m$ transistors which are being turned on and $e_1$ is the amplitude of the logic swing. From Equation 1, which is a low frequency approximation, $C_{in}$ may be plotted versus $e_{b1}$ as shown in FIG. 6.

When this nonlinear capacitive load is connected to a transmission line as shown in FIG. 7, where $Z_o$ is the characteristic impedance of the line, $e_{in}$, $e_{re}$ represent, respectively, the input ramp and the reflected voltages. The transmission line equation may be written as:

$$C_{in}\frac{de_{b1}}{dt} + \frac{2e_{b1}}{Z_0} = \frac{2e_{in}}{Z_0} \quad (2)$$

Figure 8:
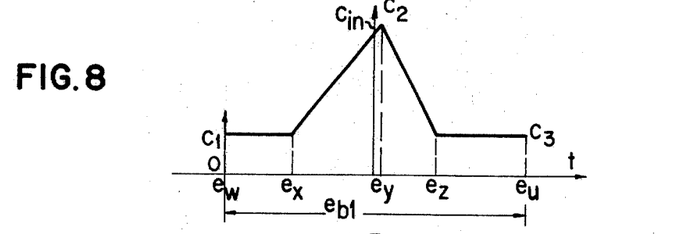
FIG. 8 is a plot of the linear approximation of the input capacitance function shown in FIG. 6.
Figure 9:
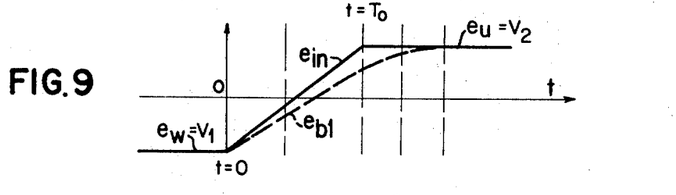
FIG. 9 shows a plot of the input signal $e_{in}$ applied to the transmission line and the input signal $e_{b1}$ at the base of the input transistor.

To a first order approximation, one may represent $C_{in}$ as a piecewise linear function $e_{b1}$, as shown in FIG. 8 and expressed functionally as follows:

$$C_{in} = \begin{cases} C_1 & \text{at } e_{w1} \leq e_{b1} \leq e_x \\ C_1 + k_1 e_{b1} & \text{at } e_x \leq e_{b1} \leq e_g \\ C_2 - k_2 e_{b1} & \text{at } e_g \leq e_{b1} \leq e_z \\ C_3 & \text{at } e_g \leq e_{b1} \leq e_n \end{cases}$$

where the various particular values of $e_{b1}$ are defined as in FIG. 9 in conjunction with FIG. 8.

Figure 10:
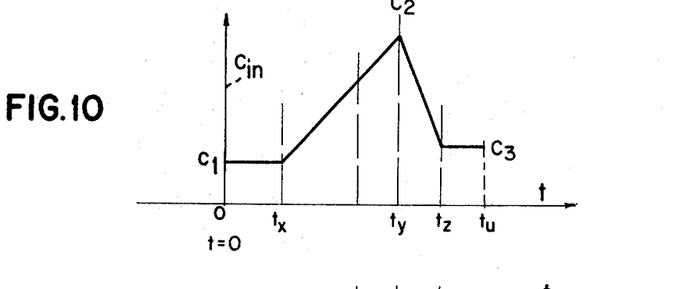
FIG. 10 shows a plot as a function of time of the piecewise linear approximation of the input capacitance.

However, the solution of the homogenous differential Equation 2 is in a transcendental form. Since the reflection $e_{re}$ is, in general, quite small compared to $e_{in}$, one may consider that $e_{b1}$ is quite close to a ramp shape and that $C_{in}$ is approximately a function of time, with $$C_{in} = \begin{cases} C_1 & \text{at } o \leq t \leq t_x \\ C_1 + k_3 t & \text{at } t_x \leq t \leq t_y \\ C_2 - k_4 t & \text{at } t_y \leq t \leq t_z \\ C_3 & \text{at } t_z \leq t \leq t_u \end{cases}$$

where the various special values of t are defined as in FIG. 10.

To determine these special values of t, the time delays between $e_{b1}$ and $e_c$ or $e_e$ should be considered. Since one is more interested in $e_{re}$ and since $e_{b1} = e_{in} + e_{re}$, Equation 2 may be change to $$C_{in}\frac{de_{re}}{dt} + \frac{2e_{re}}{Z_0} = -C_{in}\frac{de_{in}}{dt}$$

Substituting the linear functions for $C_{in}$ and $$\frac{de_{in}}{dt},$$

Equation 3 then resolves into:
for $$o < t < t_x: C_1 \frac{de_{re}}{dt} + \frac{2e_{re}}{Z_0} = -C_1 K_0$$

$$t_x < t < T_0: (C_1 + k_3 t)\frac{de_{re}}{dt} + \frac{2e_{re}}{Z_0} = -(C_1 + k_3 t)K_0$$

$$T_0 < t < t_y: (C_1 + k_3 t)\frac{de_{re}}{dt} + \frac{2e_{re}}{Z_0} = 0$$

$$t_y < t < t_z: (C_2 - k_4 t)\frac{de_{re}}{dt} + \frac{2e_{re}}{Z_0} = 0$$

$$t_z < t: C_3 \frac{de_{re}}{dt} + \frac{2e_{re}}{Z_o} = 0 \quad (4)$$

Figure 11:
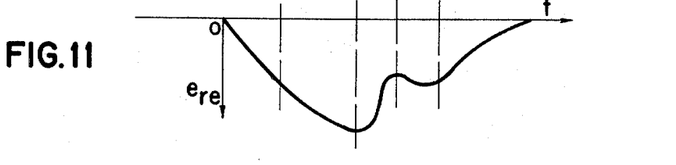
FIG. 11 shows a plot as a function of time of the reflected signal $e_{re}$ obtained as a solution of the transmission line differential equation.

The solution for $e_{re}$ is then explicit and simple as shown in FIG. 11.

Figure 12:
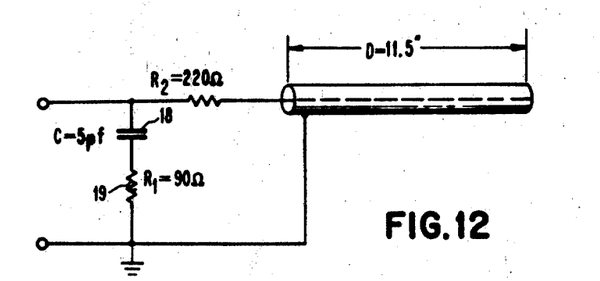
FIG. 12 is a circuit diagram of the simulated circuit model.
Figure 13:
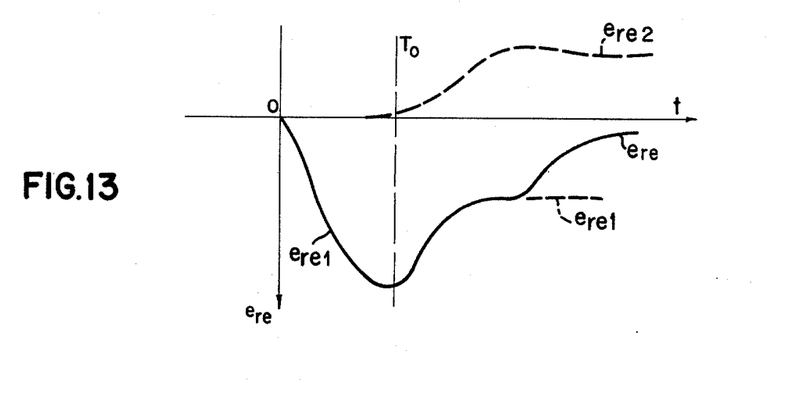
FIG. 13 shows plotted as functions of time the two reflections produced by the simulated circuit model in response to the signal applied to the simulated transmission line model.

A linearized lumped-circuit model, comprising an RC network and a delay line with a high resistance at its end, as shown in FIG. 12, represents $C_{in}$ very well. This model will give a first reflection, $e_{re1}$, when $e_{in}$ encounters the RC network in parallel to the delay line and a second reflection $e_{re2}$ which contributes to the second peak or plateau, when the voltage $(e_{in}+e_{re1})$ propagates around the delay line and redistributes to the main line. The total reflection will be the sum of $e_{re1}$ and $e_{re2}$, as shown in FIG. 13.

Figure 14:
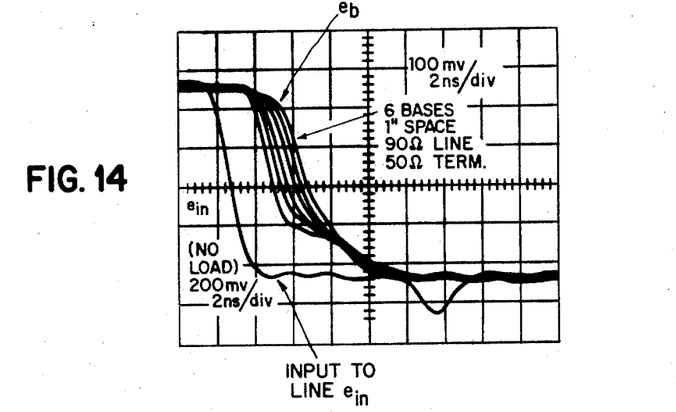
FIGS. 14 and 15 show a comparison between the responses of an actual network of six current switches and that of a simulated network having six circuit models.
Figure 15:
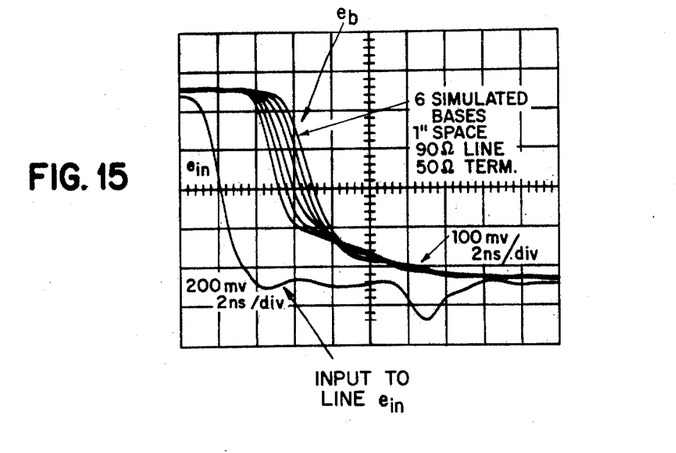

A comparison of the reflections from this physical model and from a real current-switch emitter-follower is shown in FIGS. 14 and 15. The voltage waveforms at each node of a simulated logic net with six such models are shown in FIG. 15 and may be compared to those of a net with six real current-switch emitter-followers in FIG. 14. Because of reflections, the rise time deteriorates as the input signal propagates down the line.

Since the simulator model is linearized, the spatial distances can easily be scaled up and the input signal of the generator is scaled accordingly. Extra length in the simulated line beyond the terminating resistor $R_t$ will not affect the transient performance if the proper amplitude for $R_t$ is chosen, i.e., $$(R_t+Z_{os})/(R_t+Z_{os})=R_L K_r$$

The scaling factors are shown in the following table, where the subscript "o" refers to the actual logic net, and the subscript "s" refers to the simulated model:

|  | Actual logic net | Simulated model | Scaling factor |
|---|---|---|---|
| Distance | $d_o$ | $d_s$ | $K_d = \dfrac{d_s}{d_o}$ |
| Velocity | $V_o$ | $V_s$ | $\dfrac{V_s}{V_o} = \sqrt{\dfrac{\epsilon_0}{\epsilon_s}}$ |
| Time | $t_o = \dfrac{d_o}{v_o}$ | $t_s = \dfrac{d_s}{v_s}$ | $K_t = \dfrac{t_s}{t_o}$ |
|  |  | and | $K_t = K_d \sqrt{\dfrac{\epsilon_s}{\epsilon_0}}$ |
| Resistance and characteristic impedance. | $r_o$ | $r_s$ | $K_r = \dfrac{r_s}{r_o}$ |
| Capacitance | $C_o$ | $C_s$ | $K_c = \dfrac{C_s}{C_o}$ |
|  |  | and | $K_r K_c = K_t$ |

$$\therefore K_r K_c = K_t K_d \sqrt{\dfrac{\epsilon_s}{\epsilon_0}}$$

Figure 16:
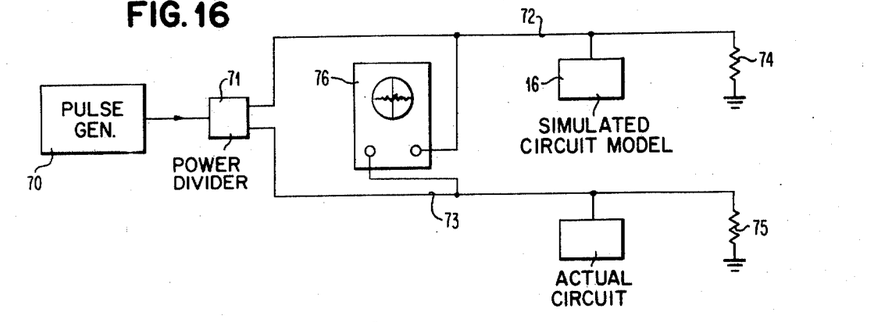
FIG. 16 is a schematic representation of the apparatus setup used to adjust the parameters of the simulated circuit model so as to precisely simulate the loading effect of the actual switching circuit.

FIG. 16 shows the apparatus setup for determining the parameters of the simulated circuit model so that the loading effect of the latter upon the simulated transmission line model will be substantially the same as that in the actual logic net. A pulse generator 70 provides a stepped ramp function signal which is transmitted by a power driver 71 to two fifty-ohm transmission lines 72 and 73. Power divider 71 is of conventional construction in the form of a T connection having terminating networks to prevent reflections in each of the lines 72, 73 from being transmitted to the other line. Lines 72, 73 are terminated by resistors 74, 75 respectively.

A simulated circuit model 16 having the network configuration of FIG. 12 is connected to line 72 and the actual circuit, such as a current-switch emitter-follower, is connected to line 73. The reference numeral 76 indicates a dual-beam oscilloscope for displaying simultaneously a first trace showing the reflected signal at the input of the simulated circuit model and a second trace depicting the reflected signal at the input of the actual circuit. The two traces may thus be simultaneously compared and the relative deviations of the traces are indicative of the parameter changes required in the circuit model so as to more accurately simulate the loading effect of the actual circuit.

Figure 17:
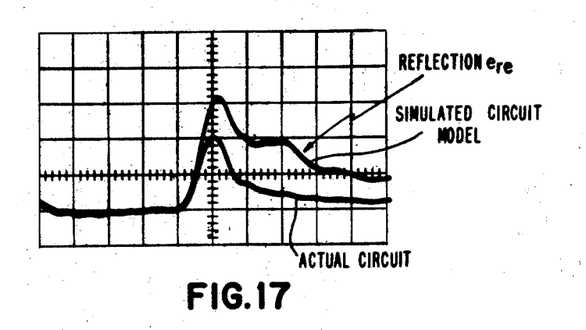
FIG. 17 shows oscilloscope traces for the reflected signals at the respective inputs of the actual circuit and the simulated circuit model having the parameter values shown in FIG. 12.
Figure 18:
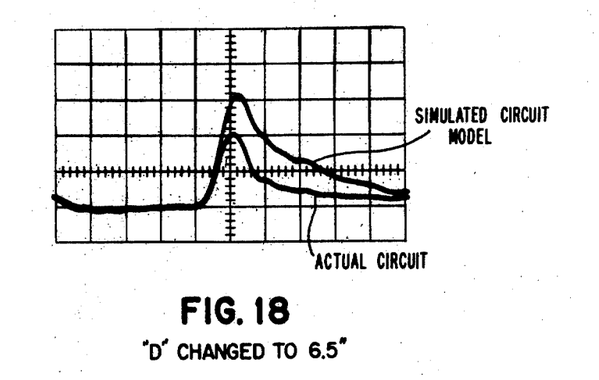
FIGS. 18 to 21 inclusive show the results of successively changing the parameter values of the model of FIG. 12 to make the loading effect of the simulated circuit model coincide with that of the actual circuit.

For example, let it be assumed that the analyst is presented with a newly developed switching circuit for which a simulated model is to be determined. On the basis of past experience he guesses at the the probable parameter values and initially selects those values indicated in FIG. 12. In FIG. 17 the upper trace shows the reflected signal at the input of the circuit model with these initially selected parameters, and the lower trace shows the reflected signal at the input of an actual current-switch emitter-follower circuit. The plateau following the peak on the upper trace indicates that the delay line is too long and therefore the delay line length D is changed from its original value of 11.5 inches to 6.5 inches. The result is shown in FIG. 18 where the plateau in the upper trace has been removed by this change.

Figure 19:
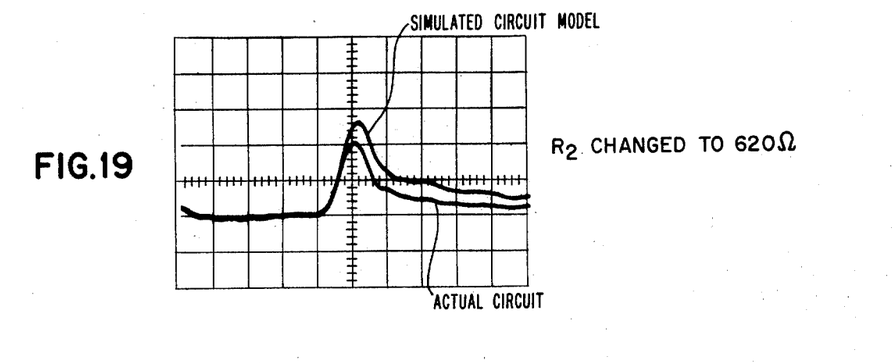
Figure 20:
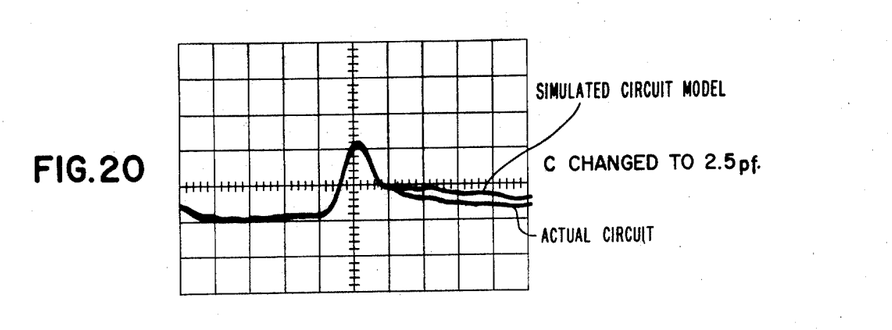
Figure 21:
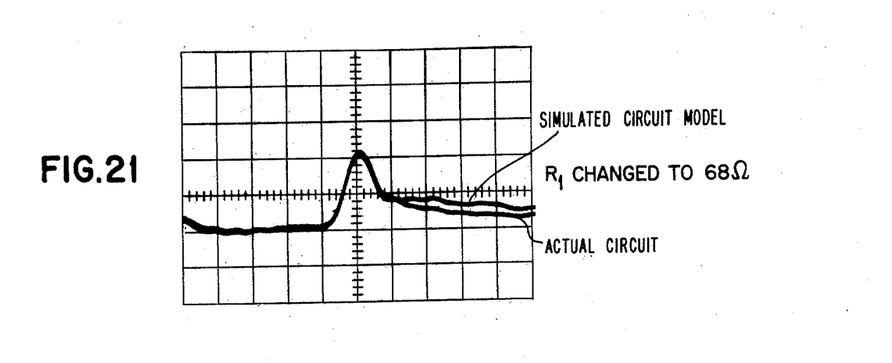

In the latter figure it will be observed that the portion following the peak is less steep in the upper trace and that the peak is of greater magnitude in the upper trace. These deviations are partially corrected by changing $R_2$ from 220Ω to 620Ω with the result of this change being shown in FIG. 19. FIG. 20 shows the result of changing the capacitor C from 5 pf. to 2.5 pf. It will be noted that the peaks of the two traces do not yet coincide exactly and this deviation is corrected by changing $R_1$ from 91Ω to 68Ω to provide the final result shown in FIG. 21. It will be seen that the reflected signal at the input of the simulated circuit model is almost precisely identical to that at the input of the actual circuit being simulated.

While the invention has been particularly shown and described with reference to the preferred embodiments thereof, it will be understood by those skilled in the art that the foregoing and other various changes in form and details may be made therein without departing from the spirit and scope of the invention.

What is claimed is:

1. An analog simulator apparatus for determining the transient response of an actual transmission line loaded by a plurality of actual active circuits and comprising:
   a simulated transmission line model having physical dimensions and electrical impedance characteristics which have predetermined scale relationships to the dimensions and impedance characteristics of said actual transmission line,
   a plurality of simulated circuit models each having an input port and an input impedance with a predetermined scale relationship to the input impedance of a respective one of said actual circuits, said actual circuits comprising semiconductor junction devices,
   coupling means for connecting said input ports of said circuit models to said transmission line model at any selected respective locations along the length of said transmission line model,
   signal generating means for applying an input transient signal to said transmission line model, and
   signal responsive means for determining the response waveform at each of said input ports.

2. An analog simulator apparatus as recited in claim 1 wherein said actual circuits are substantially nonlinear, said simulated circuit models being substantially linear, whereby said predetermined scale relationship may be varied in a linear manner.

3. An analog simulator apparatus as recited in claim 2 wherein each circuit model consists solely of passive substantially linear components.

4. An analog simulator apparatus for determining the transient response of an actual transmission line loaded by a plurality of actual active circuits and comprising:
   a simulated transmission line model having physical dimensions and electrical impedance characteristics which have predetermined scale relationships to the dimensions and impedance characteristics of said actual transmission line,
   a plurality of simulated circuit models each having an input port and an input impedance with a predetermined scale relationship to the impedance of a respective one of said actual circuits, each circuit model comprising a resistor-capacitor network and a predetermined length of delay line, coupling means for connecting said input ports of said circuit model to said transmission line model at any selected respective locations along the length of said transmission line model, signal generating means for applying an input transient signal to said transmission line model, and signal responsive means for determining the response waveform at each of said input ports.

5. An analog simulator apparatus as recited in claim 1 wherein:

said transmission line model comprises a coaxial line having an inner conductive core spaced from and surrounded by an outer conductive shield, said shield having an elongated slot therethrough and extending substantially throughout the length of said transmission line model, said input ports each comprising a pair of input terminals, said coupling means each being adapted to extend through said slot to connect one input terminal of an input port to said conductive core and to engage said conductive shield to connect thereto the other respective input terminal of said input port.

6. An analog simulator apparatus as recited in claim 1 wherein:

said signal generating means comprises a ramp generator for applying to said transmission line model a ramp function signal having a predetermined rise time, and said signal responsive means comprising an oscilloscope for observing said response waveforms.

7. An analog simulator apparatus for determining the transient response of an actual transmission line loaded by a plurality of actual active substantially nonlinear circuits and comprising:

a simulated transmission line model having physical dimensions and electrical impedance characteristics which have predetermined scale relationships to the dimensions and impedance characteristics of said actual transmission line, a plurality of simulated substantially linear circuit models each having an input port and an input impedance with a predetermined scale relationship to the input impedance of a respective one of said actual circuits, said actual circuits comprising semiconductor junction devices, and coupling means for connecting said input ports of said circuit models to said transmission line model at any selected respective locations along the length of said transmission line model.

8. An analog simulator apparatus for determining the transient response of an actual transmission line loaded by a plurality of actual active substantially non-linear circuits and comprising:

a simulated transmission line model having physical dimensions and electrical impedance characteristics which have predetermined scale relationships to the dimensions and impedance characteristics of said actual transmission line, a plurality of simulated substantially linear circuit models each having an input and an input impedance with a predetermined scale relationship to the input impedance of a respective one of said actual circuits, each circuit model consisting of a passive network comprising a resistor, capacitor and a predetermined length of delay line, and coupling means for connecting said input ports of said circuit models to said transmission line model at any selected respective location along the length of said transmission line model.

9. An analog simulator apparatus as recited in claim 7 wherein:

said transmission line model comprises a line having an inner conductive core spaced from and surrounded by an outer conductive shield, said shield having an elongated slot therethrough and extending substantially throughout the length of said transmission line model, said input ports each comprising a pair of input terminals, said coupling means each being adapted to extend through said slot to connect one input terminal of an input port to said conductive core and to engage said conductive shield to connect thereto the other respective input terminal of said input port.

10. A method for determining the transient response of an actual transmission line loaded by a plurality of actual nonlinear active circuits and comprising:

making a simulated transmission line model with physical dimensions and electrical impedance characteristics having predetermined scale relationships to the dimensions and impedance characteristics of said actual transmission line, making a plurality of simulated linear circuit models each having an input port and an input impedance with a predetermined scale relationship to the input impedance of a respective one of said active circuits, said active circuits comprising current switch emitter-follower circuits, and connecting said input ports of said circuit models to said transmission line model at selected respective locations along the length of said transmission line model.

11. A method for determining the transient response of an actual transmission line loaded by a plurality of actual active circuits and comprising:

making a simulated transmission line model with physical dimensions and electrical impedance characteristics having predetermined scale relationships to the dimensions and impedance characteristics of said actual transmission line, making a plurality of simulated linear circuit models each having an input port and an input impedance with a predetermined scale relationship to the input impedance of a respective one of said actual circuits, said actual circuits comprising semiconductor devices, connecting said input ports of said circuit models to said transmission line model at selected respective locations along the length of said transmission line model, and applying an input transient signal to said transmission line model.

12. A method for determining the transient response of an actual transmission line loaded by a plurality of actual nonlinear circuits and comprising:

making a simulated transmission line model with physical dimensions and electrical impedance characteristics having enlarged scale relationships to the dimensions and impedance characteristics of said actual transmission line, making a plurality of simulated linear circuit models each having an input port and an input impedance with an enlarged scale relationship to the input impedance of a respective one of said actual circuits, the actual circuits being current switch emitter-follower circuits, connecting said input ports of said circuit models to said transmission line model at selected respective locations along the length of said transmission line model, applying an input transient signal to said transmission line model, and determining the response waveform at each of said input ports.

13. A simulated passive linear circuit model of an actual transistor nonlinear switch and adapted to be connected to a simulated transmission line model, said circuit model comprising:
  a pair of terminals,
  a first resistor and a capacitor connected in series between said terminals,
  a second resistor having one end connected to one terminal, and
  a delay line connected to the other end of said second resistor and to the other terminal.

References Cited

UNITED STATES PATENTS

| | | |
|---|---|---|
| 2,191,271 | 2/1940 | Carter. |
| 2,400,597 | 5/1946 | Peterson. |
| 2,111,595 | 3/1938 | Leng. |
| 3,422,378 | 1/1969 | La Rosa ______________ 333—28 |

OTHER REFERENCES

"A Description of the Bonneville Power Administration Switching-Surge Analyzer," dated March 1960 (FIG. 1) and distributed as a give-away by the Bonneville Power Administration in Portland, Oreg., to visitors and inquirers.

"Bonneville Power Administration A-C Network Analyzer," dated March 1963 (page 3) and distributed as a give-away by the Bonneville Power Administration, Portland, Oreg., to visitors and inquirers.

"New Techniques on the Anacom-Electric Analog Computer," by Harder and Carleton AIEE Transactions 1950, vol. 69, pp. 547–556.

"Transient Analyzer Applications," by Johnson, General Electric Review, September 1951, pp. 22–29.

HERMAN KARL SAALBACH, Primary Examiner

U.S. Cl. X.R.

235—185; 333—29